(12) United States Patent
Severinski et al.

(10) Patent No.: US 6,536,843 B1
(45) Date of Patent: Mar. 25, 2003

(54) SEAT STRUCTURE FOR VEHICLE

(75) Inventors: Paul S. Severinski, Southgate, MI (US); Mark E. Rodgers, Washington Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/807,316

(22) PCT Filed: Oct. 15, 1999

(86) PCT No.: PCT/UP99/24224

§ 371 (c)(1),
(2), (4) Date: Apr. 11, 2001

(87) PCT Pub. No.: WO00/23298

PCT Pub. Date: Apr. 27, 2000

(51) Int. Cl.[7] .............................. B60N 2/02; B60N 2/48
(52) U.S. Cl. .................. 297/378.12; 297/15; 296/65.01
(58) Field of Search ........................... 297/378.12, 15, 297/344.15, 379; 296/69, 65.01, 66

(56) References Cited

U.S. PATENT DOCUMENTS

| | | | |
|---|---|---|---|
| 2,926,948 A | | 3/1960 | Koplin et al. |
| 2,926,951 A | | 3/1960 | Koplin |
| 4,382,629 A | | 5/1983 | Froumajou |
| 4,700,989 A | | 10/1987 | Ercilla |
| 4,805,953 A | | 2/1989 | Yamauchi |
| 4,888,854 A | | 12/1989 | Russell |
| 4,957,321 A | * | 9/1990 | Martin et al. ............ 296/65.05 |
| 5,038,437 A | | 8/1991 | Russell |
| 5,133,589 A | | 7/1992 | Kimura |
| 5,195,795 A | | 3/1993 | Cannera et al. |
| 5,482,349 A | * | 1/1996 | Richter et al. ........... 296/65.09 |
| 5,547,242 A | | 8/1996 | Dukatz |
| 5,558,386 A | | 9/1996 | Tilly |
| 5,570,931 A | | 11/1996 | Kargillis |
| 5,582,453 A | | 12/1996 | Leuchtmann |
| 5,662,367 A | | 9/1997 | Rastetter |
| 5,662,377 A | | 9/1997 | Holdampf |
| 6,123,380 A | * | 9/2000 | Sturt et al. ............... 296/65.05 |
| 6,293,603 B1 | * | 9/2001 | Waku et al. ............. 296/65.05 |

FOREIGN PATENT DOCUMENTS

| | | |
|---|---|---|
| DE | 27 52 431 | 5/1997 |
| EP | 0 030 924 | 6/1981 |
| EP | 0 151 426 | 8/1985 |
| EP | 0 749 864 | 12/1996 |
| WO | WO 96/38318 | 12/1996 |
| WO | WO 97/41001 | 11/1997 |

* cited by examiner

*Primary Examiner*—Peter M. Cuomo
*Assistant Examiner*—Erika Garrett
(74) *Attorney, Agent, or Firm*—MacMillan, Sobanski & Todd, LLC

(57) ABSTRACT

A seat mounted (18) on a floor of a vehicle (10) includes a seat button (18a) having front and rear portions. The seat bottom is movable between an upper position such that the front and rear end portions are at respective first positions, and a lowered position such that the first and rear end portions are at respective second positions. The front end portion moves downwardly a greater distance from its respective first to second position than the distance the rear end portion moves from its respective first to the second position when the seat bottom is moved from its upper position to its lowered position. The seat can further include a seat back (18b) pivotally connected to the seat bottom (18a) such that the seat back is movable to a generally horizontal position. A pair of seats (14, 18) can be incorporated into a vehicle interior (10) to define front (14) and rear (18) seats. The front seat (14) has a panel (24) pivotally attached to the seat back (14b) of the front seat (14). The panel (24) is movable to a horizontal position such that the panel extends from the front seat back to the rear seat to bridge a gap between the seat backs of the front and rear seats when in their respective forward positions. The panel and seat backs of the front and rear seats form a generally horizontal coplanar support surface.

13 Claims, 6 Drawing Sheets

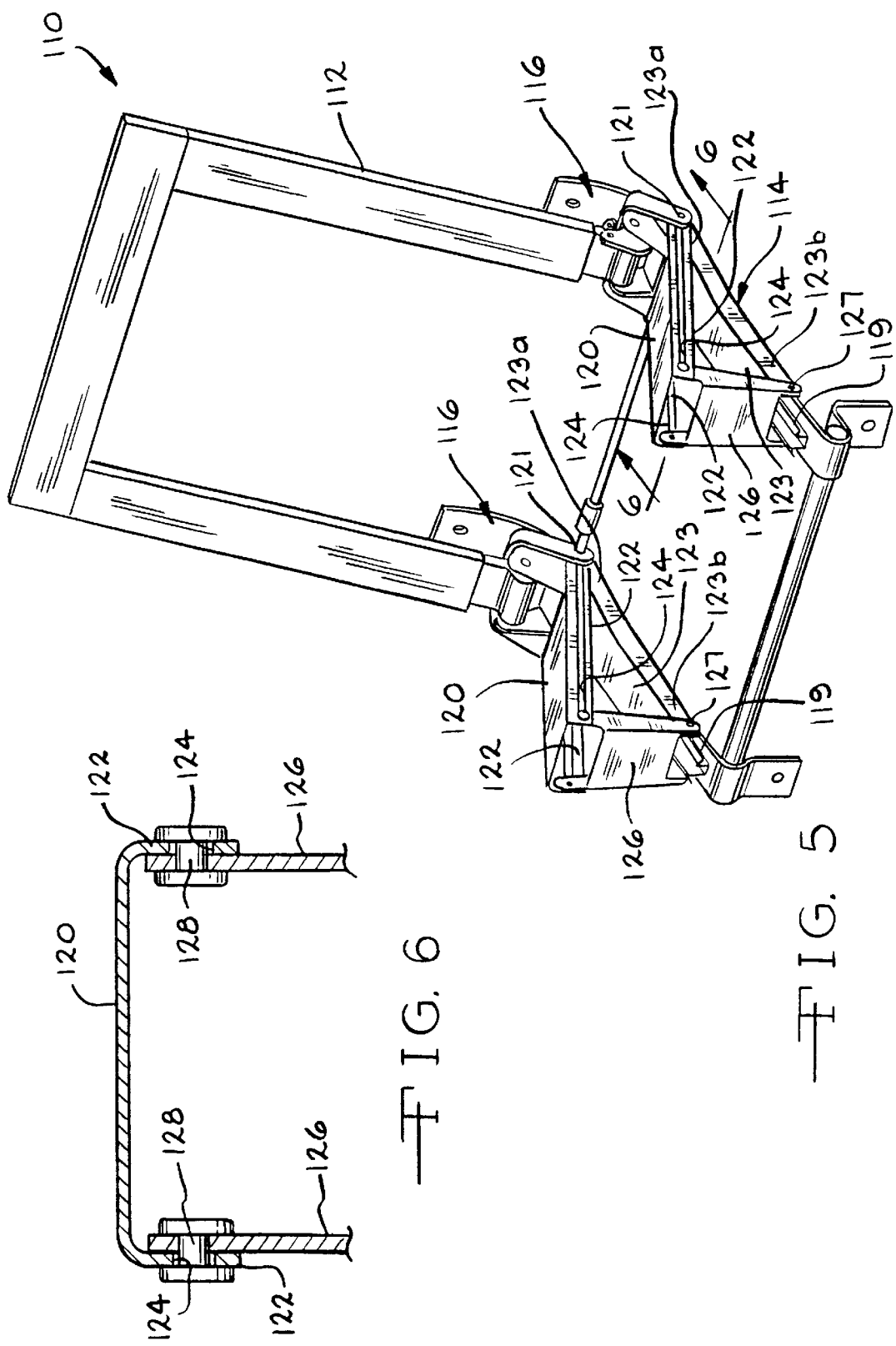

SEAT STRUCTURE FOR VEHICLE

BACKGROUND OF THE INVENTION

This invention relates in general to vehicle seats, and in particular to a vehicle seat arrangement in which a relatively flat horizontal support surface can be formed.

A typical four or five person passenger vehicle includes a pair of front seats and either a single relatively wide rear seat or a pair of rear seats. The seats include seat backs and seat bottoms. In some vehicles, the seat backs of the rear seats are pivotally connected to the seat bottom. The seat backs are movable between an upright position, for the seating of an occupant, and a forward position, wherein the seat back is pivoted forward to a position above the seat bottom. Positioning the rear seat back in its forward position permits access to the vehicle trunk compartment directly behind the rear seats. It is sometimes desirable to configure the seat back of a rear seat so that when the seat back is in its forward position a back surface of the seat back is generally horizontal. The back surface of the seat back can also be coplanar with the trunk floor so that a relatively flat horizontal support surface is formed. It is also known to construct a front seat that is movable to a forward position so that a back surface of the seat back is orientated in a generally horizontal manner.

To accommodate the seat back in its forward position, the cushions of the seat back and bottom are relatively thin and flat without much contour so that the seat back can lay flush against the sea bottom. However, the relatively thin cushions are generally undesirable to the occupant of the seat. Although the pivot point between the seat back and the seat bottom can be positioned vertically higher to accommodate thicker cushions, this has an undesirable effect of raising the back surface of the seat back when the seat back is in its forward position, thereby reducing the total volume of interior cargo room. If the back surface of the seat back is higher than the trunk floor, a generally undesirable stepped support surface would be created. To create a generally planar support surface, the vehicle trunk floor would also be required to be raised, thereby reducing the total volume of the interior cargo room even more.

It is known to lower the seat bottom to accommodate the seat back while in its forward position, such as the seat disclosed in U.S. Pat. No. 5,570,931 to Kargilis et al. The seat bottom is moved both in a forward direction and a downward direction such that the seat bottom remains in a generally horizontal position. To move the seat back to its forward position, a relatively large open space is required between the front edge of the seat bottom and rear of the front seat because of the forward movement of the seat bottom. Thus, anything placed on the vehicle floor between the front edge of the seat bottom and rear of the front seat must be moved out of the way. Also, to have a generally flat planar support surface formed by the seat back and the trunk floor, the trunk floor must be positioned at relatively elevated distance with respect to the vehicle floor to accommodate the seat bottom and movement thereof

BRIEF SUMMARY OF THE INVENTION

This invention relates in general to a vehicle seat and vehicle interior which can be configured to form a generally horizontal coplanar support surface.

A seat mounted on a floor of a vehicle includes a seat bottom having front and rear end portions. The seat bottom is movable between an upper position such that the front and rear end portions are at respective first positions, and a lowered position such that the first and rear end portions are at respective second positions. The front end portion moves downwardly a greater distance from its respective first to second position than the distance the rear end portion moves from its respective first position to its second position when the seat bottom is moved from its upper position to its lowered position. Preferably, the seat further includes a seat back pivotally connected to a rear end portion of the seat bottom such that the seat back is movable to a generally horizontal position.

A pair of seats can be incorporated into a vehicle interior to define front and rear seats. The front seat preferably includes a panel pivotally attached to a bottom portion of a seat back of the front seat. The panel is movable to a generally horizontal position such that the panel extends from the front seat back to the rear seat to bridge a gap between the seat backs of the front and rear seats when in their respective forward positions. The panel and seat backs of the front and rear seats form a generally horizontal coplanar support surface.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a perspective view of a second embodiment of a seat frame assembly in accordance with the present invention.

FIG. 6 is a partial sectional view of a portion of the bottom frame of the seat frame assembly taken along Lines 6—6 in FIG. 5.

DETAILED DESCRIPTION OF THE INVENTION

Figure 1:
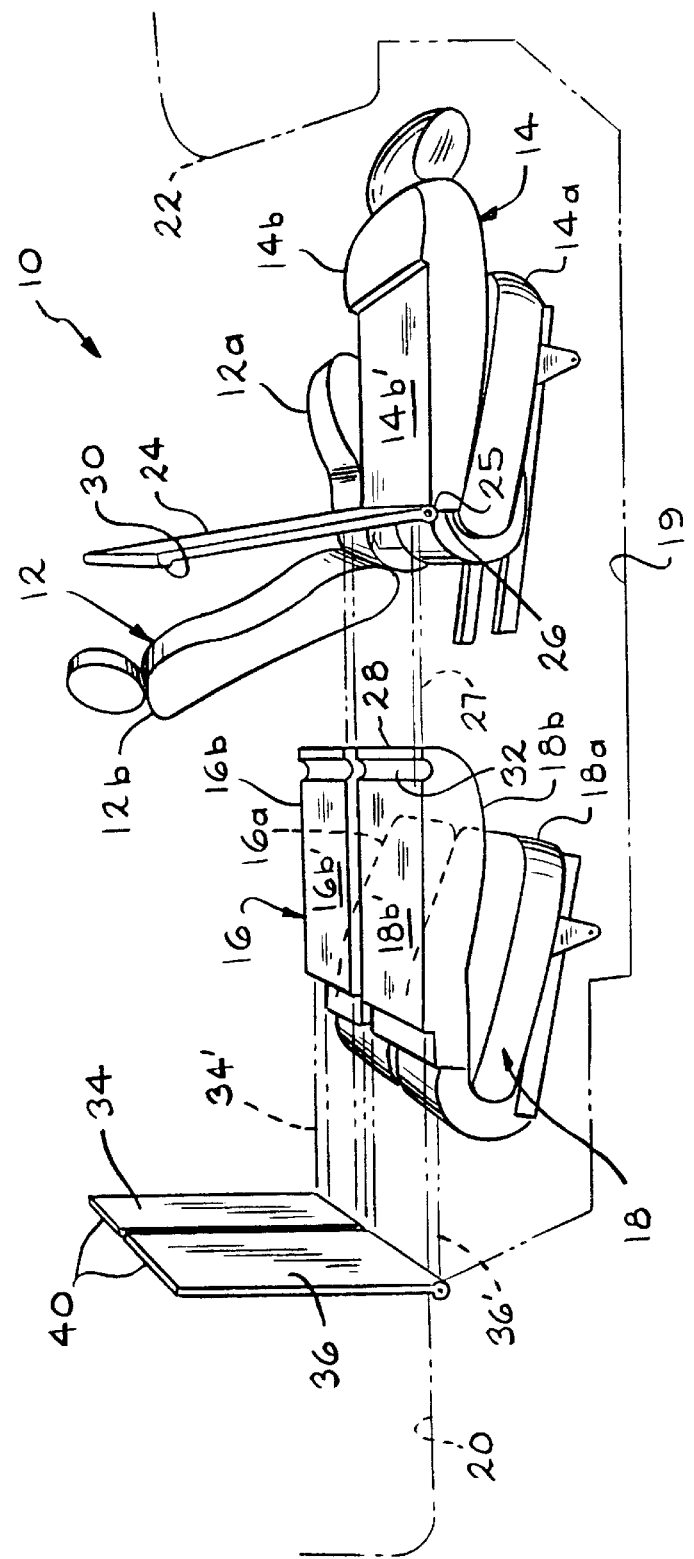
FIG. 1 is schematic perspective side view of a vehicle interior, in accordance with the present invention.

Referring now to the drawings, there is illustrated in FIG. 1 a portion of a vehicle interior, indicated generally at 10, in accordance with the present invention. The vehicle interior 10 includes a driver seat 12, a front passenger seat 14, and a pair of rear seats 16 and 18 mounted on a vehicle floor, indicated schematically by phantom lines 19. Of course, the vehicle floor 19 can have any stepped or contoured shape. As will be described in detail below, the front passenger seat 14 and the pair of rear seats 16 and 18 preferably fold to a position which cooperate with various panels and structures to form a generally horizontal and planar support surface. Preferably, the support surface extends across the entire vehicle interior 10 from a trunk floor 20 to an instrument panel 22.

Each of the seats 12, 14, 16 and 18 generally include seat bottoms 12a, 14a, 16a, and 18a, respectively, and seat backs 12b, 14b, 16b, and 18b, respectively. The seat backs 12b, 14b, 16b and 18b are selectively movable and adjustable between an upright position and a forward position. As shown in FIG. 1, the seat back 12b of the driver seat 12 is in an upright position. The seat backs 14b, 16b, and 18b are illustrated in their furthermost forward positions, such that the seat backs 14b, 16b, and 18b are above their respective seat bottoms 14a, 16a, and 18a. When the seat backs 14b, 16b, and 18b, are in their furthermost forward position, back surfaces 14b', 16b', and 18b' of the seat backs 14b, 16b, and 18b, respectively, are in a generally horizontal position to form portions of the support surface. Preferably, the back surfaces 14b', 16b', and 18b' are generally flat and are coplanar with each other.

Figure 2:
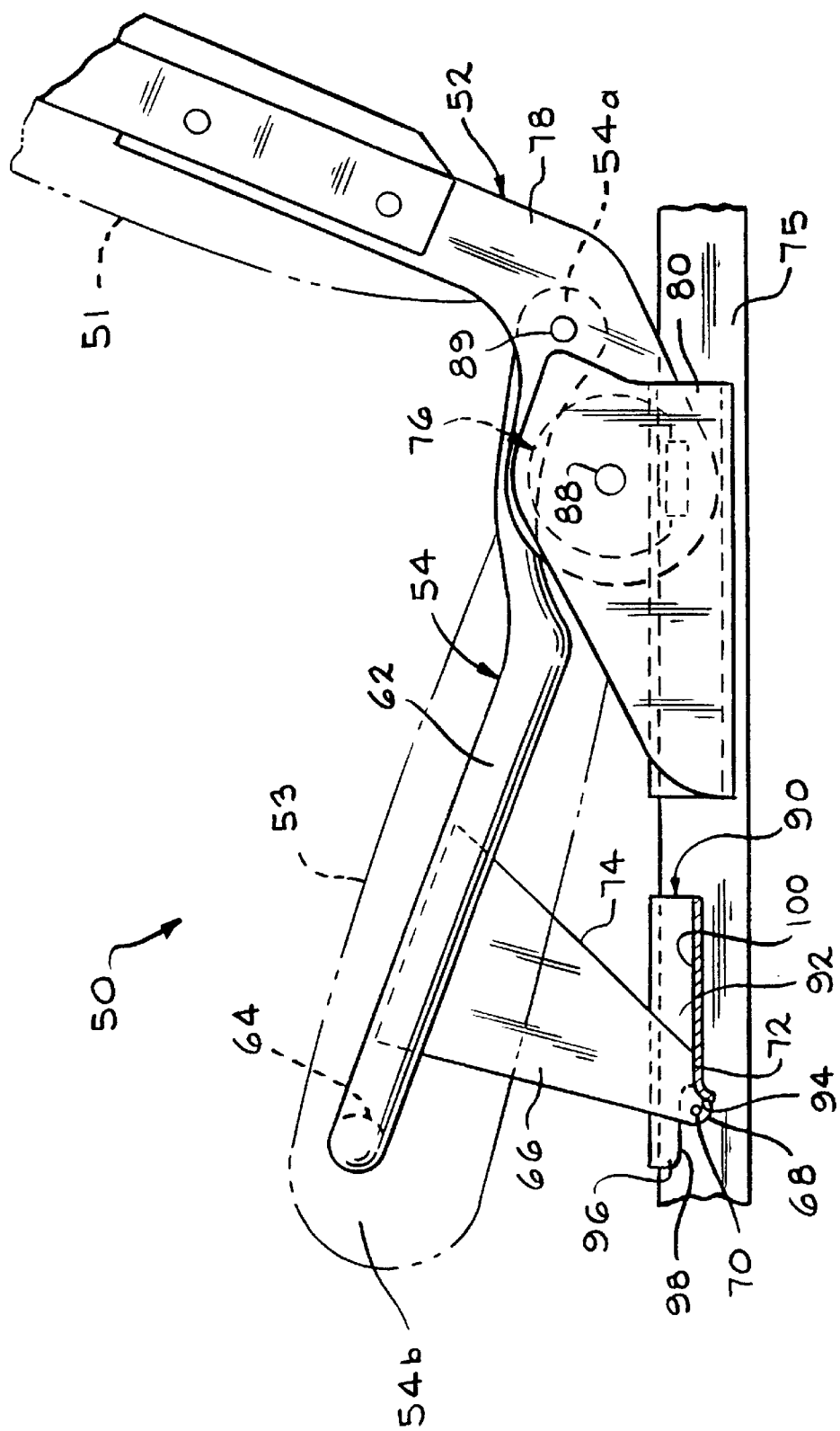
FIG. 2 is a side elevational view partially in section of a first embodiment of a frame assembly, in accordance with the present invention, wherein the frame assembly is shown in an upright position.

If desired, the front passenger seat 14 and the rear seat 18 can be wider than the driver seat 12 and the rear seat 16, respectively, as shown in FIG. 2. This larger width provides for a relatively wide support surface when just the front passenger seat back 14b and the rear seat back 18b are moved to their respective forward positions.

The front passenger seat 14 preferably includes a panel 24 pivotally mounted at a bottom end, indicated generally at 26, of the seat back 14b about a pivot 25. The panel 24 is movable from a stowed position generally flush against the back surface 14b' of the seat back 14b, to an extended position, indicated by phantom lines 27, in which the panel 24 extends from the bottom end 26 of the seat back 14 to an upper end 28 of the seat back 18b when in its furthermost forward position. The panel 24 functions to bridge the gap between the seats 14 and 18 and forms a portion of the support surface when the panel 24 is in its extended position. Preferably, the panel 24 includes a raised portion 30 which cooperates with a recessed portion 32 formed in the upper end 28 of the seat back 18 to more securely join the panel 24 to the seat back 18b to help prevent the panel 24 from separating from the seat back 18. Of course, the panel 24 can have any suitable structure or latch mechanism (not shown) to help secure the panel 24 to the seat back 18b. If desired, the driver seat 12 and the rear seat 16 can be similarly configured so that a support surface is created therebetween.

The vehicle interior 10 further includes rear panels 34 and 36 located behind the rear seats 16 and 18, respectively. The rear panels 34 and 36 are pivotally mounted to the vehicle floor 19 or the trunk floor 20 at a pivot 38. The rear panels 34 and 36 are movable between an upright position, as shown in FIG. 1, and a horizontal lowered position, as indicated by phantom lines 34' and 36', respectively. In the upright position, top portions 40 of the rear panels 34 and 36 may rest against the seat backs 16b and 18b. The top portions 40 of the rear panels 34 and 36 may slide along the back surfaces 16b ' and 18b' according to the angle of inclination in which the rear seat backs 16b and 18b are adjusted to. In their lowered positions, the rear panels 34 and 36 extend between the trunk floor 20 and lower ends 42 and 44 of the seat backs 16b and 18b. The rear panels 34 and 36 function to bridge the gap between the trunk floor 20 and the seats 16 and 18 to form a portion of the support surface.

A generally horizontal support surface extending from the trunk floor 20 to the instrument panel 22 can be formed by properly positioning the seat backs 14b, 16b, and 18b, and the panels 24, 34, and 36. Preferably, when in their horizontal positions, the seat backs 14b, 16b, and 18band the panels 24, 34, and 36 are coplanar with each other to form a continuous flat coplanar support surface.

Preferably, the seats 12, 14, 16, and 18 are selectively movable in a forward and aft direction with respect to the vehicle floor 20 and include the same framework and adjuster assemblies, as discussed in detail below. There is illustrated in FIGS. 2 through 4 a first embodiment of a seat frame assembly, indicated generally at 50, which can be used for the seats 12, 14, 16, and 18.

Figure 3:
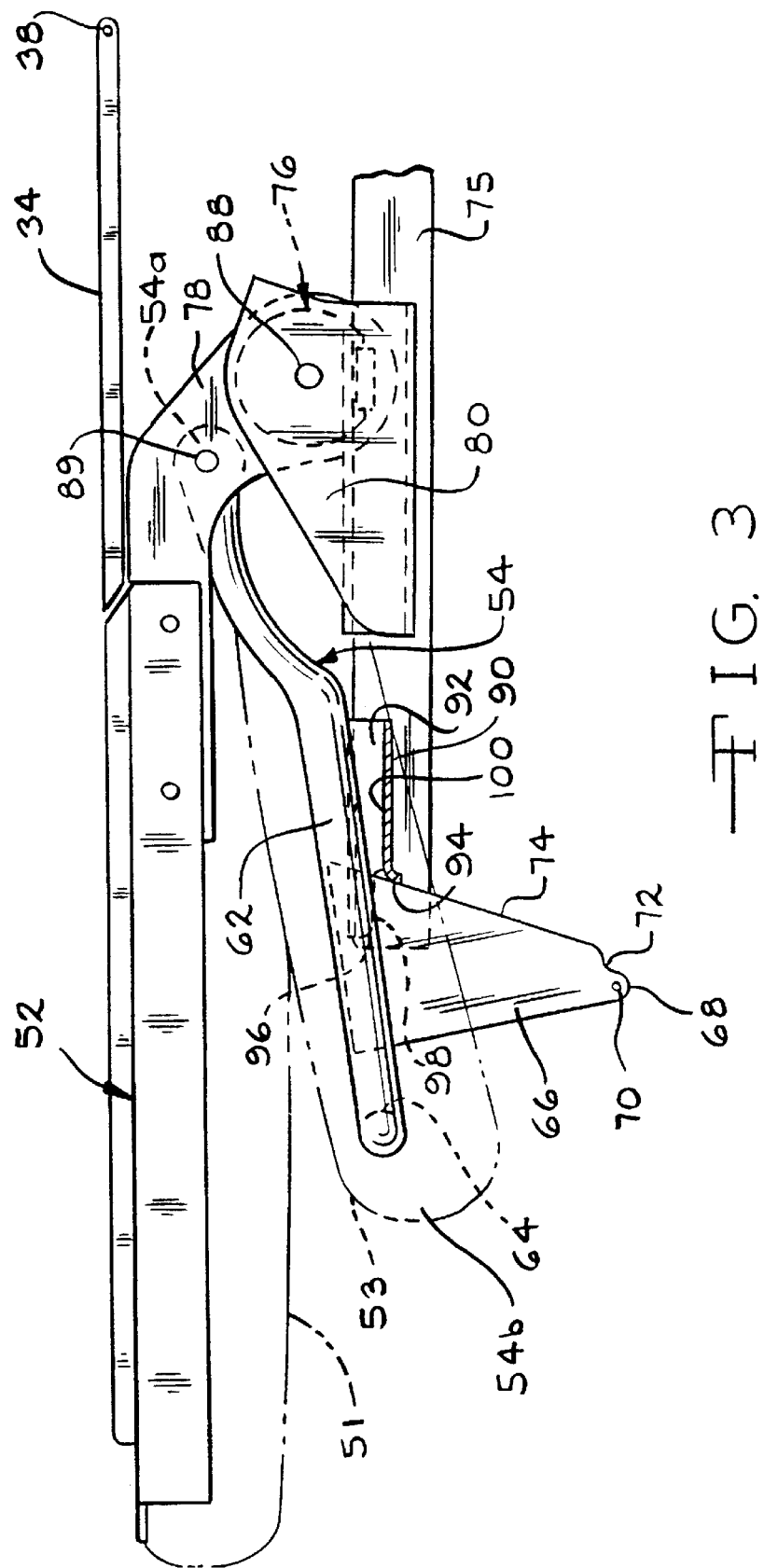
FIG. 3 is a side elevational view partially in section of the frame assembly illustrated in FIG. 2, wherein the seat bottom frame is in its lowered position and the seat back frame is in its forward position.
Figure 4:
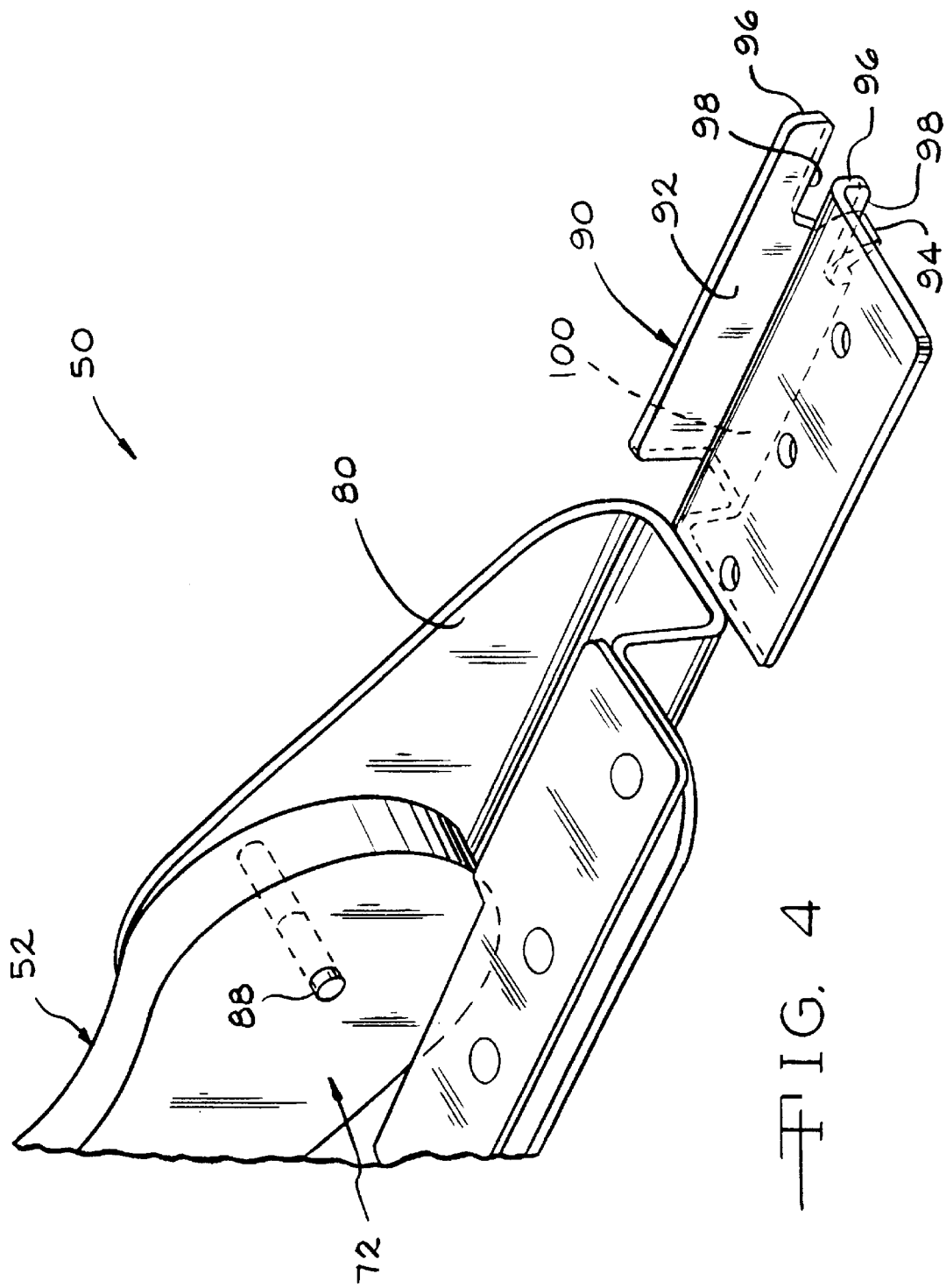
FIG. 4 is a perspective view of portions of an adjuster assembly of the frame assembly of FIG. 2.

As best shown in FIGS. 2 through 4, the frame assembly 50 includes a back frame, indicated generally at 52, and a bottom frame, indicated generally at 54. The back frame 52 supports a back cushion, indicated by phantom lines 51. The bottom frame 54 supports a bottom cushion, indicated by phantom lines 53. The back frame 52 and the bottom frame 54 can be any suitable conventional framework to provide rigidity to the seat and support the cushions 51 and 53. For example, the bottom frame 54 can be formed from a generally U-shaped tubular member having a pair of arms 62 joined by a cross bar 64 extending generally along a front edge of the frame assembly 50.

The frame assembly 50 includes a pair of relatively flat triangular-shaped plates 66. The plates 66 are attached to and extend downward from each of the arms 62, respectively. The plates 66 have a lower end 68 having a pin 70 extending therethrough, the reason for which will be explained below. The plates 66 also have a notched surface 72 and a ramped surface 74 formed thereon. The notched surface 72 is adjacent the lower end 68.

If desired, the frame assembly 50 can include a pair of seat track mechanisms 75 to enable the frame assembly 50 to move in a fore and aft direction. The seat track mechanism 75 can be any conventional seat track mechanism having a lower track mounted on the vehicle floor and an upper track moveable relative to the lower track. The upper track is fastened to the bottom frame 54. The seat track mechanism 75 can be manually or electrically operated. Note that the seat track mechanism 75 is not shown in FIG. 4 for clarity.

The frame assembly 50 further includes a recliner mechanism, indicated generally at 76. The recliner mechanism 76 pivotally mounts the back frame 52 to the bottom frame 54 so that the seat back frame 52 can be selectively moved to various inclined positions with respect to the seat bottom. Any suitable recliner mechanism can be used. The recliner mechanism 76 includes a pair of arms 78 fastened to the back frame 52. The recliner mechanism 76 further includes a pair of brackets 80 which are fastened to the respective seat track mechanisms 75. The recliner mechanism 76 permits rotational movement between the arms 78 and the bracket 80, thereby permitting the seat back to be moved to an inclined position relative to the seat bottom about a pivot axis 88. The arms 62 of the bottom frame 54 are pivotally attached to the arms 78 of the recliner mechanism 76 about a pivot 89.

The frame assembly 50 further includes a pair of adjuster brackets 90. The adjuster brackets 90 are fastened to the respective seat track mechanisms 75 and are at a fixed distance relative to the brackets 80. Each of the adjuster brackets 90 has a channel 92 formed therein extending along the fore and aft direction. The channel 92 ends in a curved ledge 94. The channel 92 receives the notched surface 72 of the plate 66 when the bottom frame 54 is in an upper position, as shown in FIG. 2. The adjuster brackets 90 further include a pair of extension members 96 extending in a forward direction from the channel 92. The extension members 96 have a lower edge 98 which is positioned above that an upper surface 100 of the channel 92.

The plates 66 and adjuster brackets 90 generally define adjuster assemblies which function to lower the bottom frame 54, and corresponding seat bottom. The bottom frame 54 is lowered to provide clearance for the seat back when the seat back is moved to its furthermost forward position to form a portion of the horizontal support surface. For the illustrated embodiment of the frame assembly 50, the connections of the back frame 52, the bottom frame 54, and the recliner mechanism 76, simultaneously move the bottom frame 52 to a lowered position when the back frame 52 is moved to its forward position, as shown in FIG. 3. Of course, the frame assembly 50 can be configured such that the back frame 52 moves independently from the bottom frame 54.

When the bottom frame 54 is in its upper position, as shown in FIG. 2, the bottom frame 54 is positioned for the seating of an occupant. In the upper position, the notched surface 72 of the plate 66 rests on the upper surface 100 of the channel 92, thereby supporting the bottom frame 54. The bottom frame 54 is prevented from lifting upward by the pin 70 of the plate 66 which is trapped underneath the lower surface 98 of the extensions 96. When the back frame 52 is moved in a direction to its forward position, rotating counter-clockwise as viewing FIGS. 2 and 3, the bottom frame 54 also moves in a slight forward direction, due to the placement of the pivot axis 88 relative to the pivot axis 89. As the bottom frame 54 is moved slightly forward, the notched surface 72 of the plate 66 slides across the upper surface 100. Sufficient movement will cause the notched surface 72 to advance past the ledge 94 causing the bottom frame to move downward such that the ramped surface will slide across the ledge 94, as shown in FIG. 3. Note that a rear end portion, indicated generally at 54a, of the bottom frame 54 adjacent the pivot 89 will be vertically displaced slightly higher relative to the bracket 80 when the seat back is in its forward position than when the seat back is in its upright position. Thus, a front end portion, indicated generally at 54b, of the bottom frame 54 moves downwardly a greater distance from its upper position to its lowered position than the distance the rear end portion 54a of the bottom frame 54 moves from its upper position to its lowered position.

There is shown in FIGS. 5 and 6 a second embodiment of a frame assembly, indicated generally at 110, which may be used with the seats 12, 14, 16, and 18 of FIG. 1. The frame assembly 110 includes a back frame 112, a bottom frame 114, and a recliner mechanism 116. The frame assembly 110 further includes an adjuster assembly, indicated generally at 118 which functions to lower a portion of the bottom frame 114 to provide clearance for the seat back when the seat back frame 112 is moved to its furthermost forward position to form a portion of the horizontal support surface. Note that the back frame 112 is shown in its upright position in FIG. 5. The back frame 112, the bottom frame 114, and the recliner mechanism 116 can have any suitable conventional structure. The frame assembly 110 can include a conventional seat track mechanism 119 mounted between the bottom frame 114 and the vehicle floor 19 to provide fore and aft movement of the seat. The back frame 114 and the bottom frame 114 can support any suitably shaped and structured cushion (not shown).

The adjuster assembly 118 includes a pair of upper brackets 120 pivotally mounted to a pair of frame members 123. The upper brackets 120 are pivotally mounted on rear end portions 123a of the frame members 123. The upper brackets 120 have an inverted U-shaped cross-section having a pair of flanges 122 extending therefrom. Each of the flanges 122 has a slot 124 formed therein. The cushion (not shown) for the bottom frame 114 is fixed relative to the upper brackets 120. The adjuster assembly 118 further includes a pair of lower brackets 126 having a U-shaped cross-section similar to the upper brackets 120. One end of the lower brackets 126 is pivotally attached to a front end portion 123b of the frame member 123 at a pivot 127. As best shown in FIG. 6, the other end of the lower brackets 126 has pins 128 extending therethrough which are slidably mounted within the respective slots 124 of the upper bracket 120. The upper brackets 120 can be lowered relative to the track mechanism 119 by advancing the upper end of the lower brackets 126 in a direction towards the back frame 112 such that the pins 128 slide along within the respective slots 124. Lowering of the upper brackets 120 accommodates the cushion of the seat back frame 112 when moved to its forward position, as described above with respect to the frame assembly 50.

Figure 7:
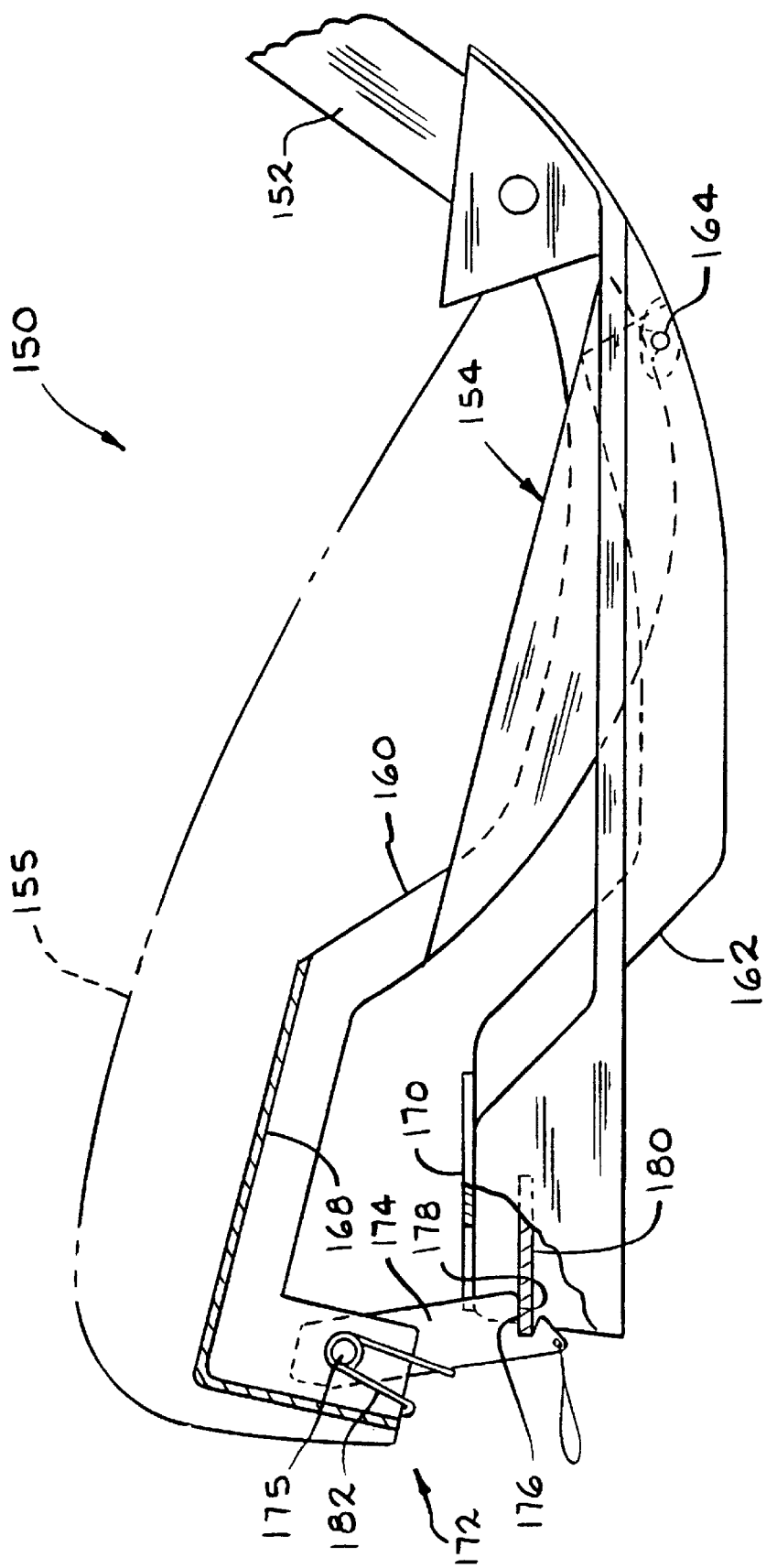
FIG. 7 is a side sectional view of a third embodiment of a seat frame assembly, in accordance with the present invention.

There is illustrated in FIG. 7 a third embodiment of a frame assembly, indicated generally at 150, in accordance with the present invention. The frame assembly 150 includes a back frame, indicated generally at 152 and a bottom frame, indicated generally at 154. The bottom frame 154 supports a bottom cushion, indicated by phantom lines 155. The back frame 152 and the bottom frame 154 can be any suitable conventional framework to provide rigidity to the seat and support cushions. For example, the bottom frame 154 can be formed from a stamped metal sheet. The bottom frame 154 includes an upper pan 160 and a lower pan 162 positioned below the upper pan 162. The lower pan 162 can be mounted on the vehicle floor 19 via a track mechanism (note shown). The upper pan 160 is pivotally attached to the lower pan 162 at a pivot 164. The upper pan 160 is movable between an upper position, as shown in FIG. 7, and a lower position to accommodate the cushion (not shown) of the back frame 152 when moved to its forward position, as described above with respect to the frame assemblies 50 and 110. In the lower position, a bottom surface 168 of the upper pan 160 rests on a top portion 170 of the lower pan 162.

The frame assembly 150 further includes a latch assembly, indicated generally at 172. The latch assembly 172 includes a latch 174 which is pivotally connected to the upper pan 160 by a pin 175. The latch 174 includes a slot 176 formed therein defining a ledge 178. As shown in FIG. 7, when the upper pan 160 is in its upper position, the ledge 178 of the latch 174 rests on a plate 180 attached to the lower pan 162. Thus, the latch 174 supports the upper pan 160 relative to the lower pan 162. The upper pan 160 is prevented from being lifted upwardly when in its upper position by the cooperation of the latch 174 and the slot 176 of the latch 174. The lower portion of the latch 174 is preferably biased against the plate 180 by a spring 182 to help retain the plate 180 within the slot 176. Preferably, the latch assembly 172 includes a strap 184 attached to the lower portion of the latch 174 to assist in manually moving the latch 174.

To move the upper pan 160 to its lower position, the strap 184 can be manually pulled in a leftward direction, as viewing FIG. 7, thereby causing the latch 174 to pivot about the pivot 176 in a clockwise direction. Movement of the latch 174 in a clockwise direction causes the ledge 178 of the latch 174 to move away from the plate 180, thereby enabling the upper pan 160 to be lowered to its lower position, such that the bottom surface 168 of the upper pan 160 rests on the top portion 170 of the lower pan 162.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A seat mounted on a floor of a vehicle, said seat comprising a seat bottom having front and rear end portions, said seat bottom being movable between an upper position such that said front and rear end portions are at respective first positions, and a lowered position such that said first and rear end portions are at respective second positions;

wherein said seat bottom includes:

a frame for supporting a cushion;

bracket defining a ledge; and an arm extending downwardly from said frame, said arm having an end resting on said ledge of said bracket when said seat bottom is in said upper position, said end of said arm being movable to a position beyond said ledge and lower than said ledge such that a ramped surface of said arm slides along said ledge of said bracket when said seat bottom is moved from said upper position to said lowered position.

2. The seat of claim 1 further including a seat back pivotally mounted on said rear end portion of said seat bottom, said seat back movable to a forward position such that said seat back is positioned above said seat bottom and extending in a generally horizontal position.

3. The seat of claim 2, wherein said seat bottom is pivotally mounted on said seat back such that movement of said seat back to said forward position simultaneously causes said seat bottom to move to said lowered position.

4. The seat of claim 3, wherein said bracket further includes an extension extending therefrom, said extension positioned above said channel, said arm further including a pin positioned underneath said extension when said seat bottom is in said upper position to prevent the seat bottom from being pivoted in an upward direction.

5. The seat of claim 1, wherein said seat bottom includes:

a frame member having front and rear end portions;

an upper bracket having a slot formed therein, said upper bracket pivotally attached to said frame member; and a lower bracket having a first end pivotally attached to said front end portion of said frame member, said lower bracket having a second end slidably disposed within said slot of said upper bracket, wherein the slidable engagement of said lower bracket enables said seat bottom to move between said upper and lower positions.

6. The seat of claim 1, wherein said seat bottom includes:

an upper pan having front and rear end portions;

a lower pan pivotally connected to said rear end portion of said upper pan, said upper pan moveable between an upper position spaced apart from said lower pan, and a lower position wherein said upper pan rests on said lower pan; and a latch moveable between a first position preventing movement of said upper pan relative to said lower pan, and a second position permitting said upper pan to be pivoted between said upper and lower positions.

7. A vehicle interior comprising:

a front seat having a seat back and a seat bottom, said front seat movable to a forward position such that said seat back of said front seat is in a generally horizontal position;

a rear seat having a seat back and a seat bottom, said rear seat movable to a forward position such that said seat back of said rear seat is in a generally horizontal position, and wherein a gap exists between said seat backs of said front and rear seats when in respective forward positions; and a panel pivotally attached to said seat back of said front seat, said panel movable to a horizontal position such that said panel extends from said front seat back and engages with a portion of said seat back of said back seat to bridge said gap, such that said panel and seat backs of said front and rear seats form a generally horizontal coplanar support surface, wherein said rear seat includes a receiving structure for engaging with a mating structure formed in said panel.

8. The vehicle interior of claim 7 further including a generally horizontal trunk floor and second panel pivotally attached to the vehicle and movable to a horizontal position coplanar with said back surface of said seat back of said rear seat in its forward position, said second panel extending between the trunk floor and said back surface of said rear seat, such that said seat backs of said front and rear seats, said panel, said second panel, and said trunk floor form a generally horizontal coplanar support surface.

9. The vehicle interior of claim 7, wherein said panel has a first end and a second end pivotally attached to said seat back, said first end of said panel engages with a bottom portion of said seat back of said rear seat when said panel is in said horizontal position to provide support for said panel.

10. The vehicle interior of claim 7, wherein said first end of said panel includes a first mating structure which engages with a second mating structure formed in said bottom portion of said seat back when said panel is in said horizontal position.

11. The vehicle interior of claim 10, wherein said first mating structure is a raised portion formed in said first end of said panel, and said second mating structure is a recess formed in said bottom portion of said seat back.

12. The seat of claim 1, wherein said arm is fixed relative to said frame.

13. The seat of claim 1, wherein said bracket includes a channel formed therein, and wherein said arm is slidably disposed in said channel.

* * * * *